Feb. 8, 1938.    J. DICHTER    2,107,979
APPARATUS FOR FORMING SCREW THREADED NECKS
Filed April 22, 1935

INVENTOR
JAKOB DICHTER

BY

ATTORNEY

Patented Feb. 8, 1938

2,107,979

UNITED STATES PATENT OFFICE 2,107,979

APPARATUS FOR FORMING SCREW-THREADED NECKS

Jakob Dichter, Berlin-Schoneberg, Germany

Application April 22, 1935, Serial No. 17,612
In Germany April 23, 1934

1 Claim. (Cl. 49—23)

This invention relates to a method and apparatus by which screw threaded necks may be formed on bodies such for example, as glass vials.

One of the primary objects of this invention is to provide a method and apparatus of the above mentioned character which will so shape the end of the neck around the mouth of the body that the same will be adapted to be sealed closed by a companion cap.

More particularly the invention contemplates the provision of a method and apparatus by which a smooth rim may be formed between the threaded portion of the neck and the mouth end thereof so that a closure cap may fit snugly against this rim.

Figure 1:
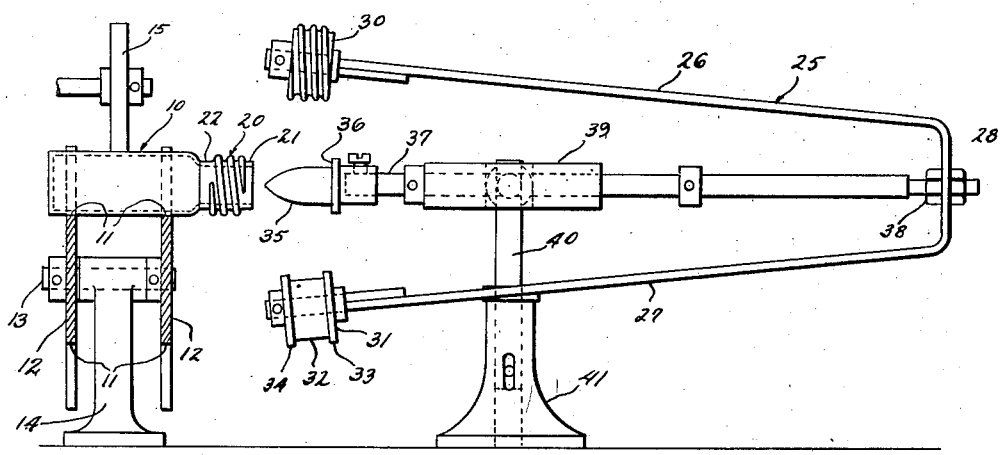
Figure 2:
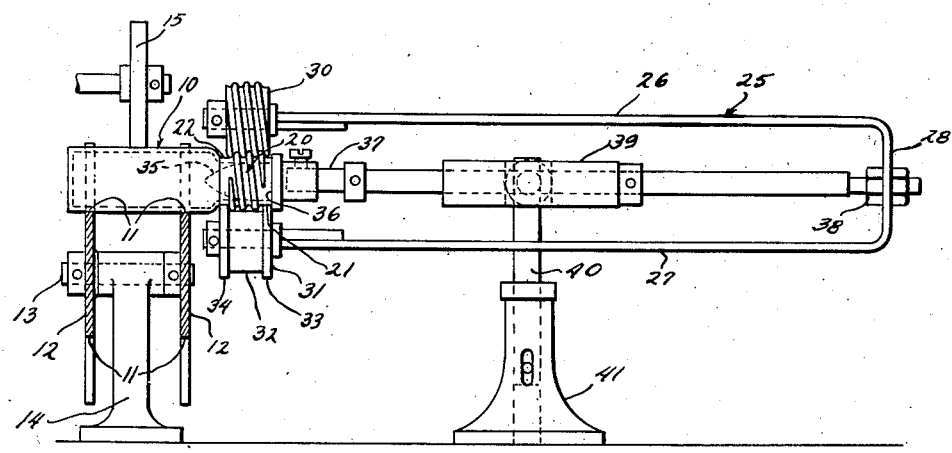
Figure 3:
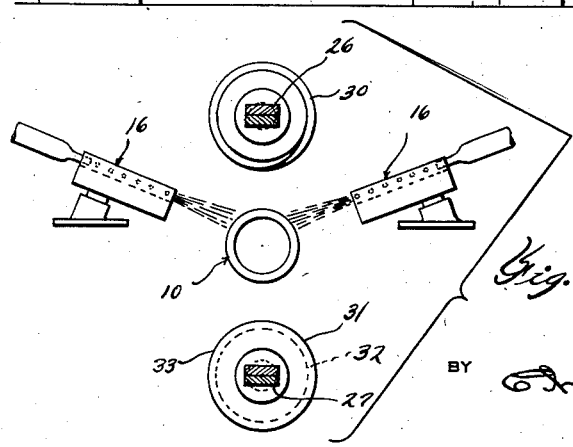

Other objects and advantages of this invention will become more apparent as the following description proceeds particularly when reference is had to the accompanying drawing wherein Fig. 1 is a side elevational view of an apparatus by which the method may be efficiently performed;

Fig. 2 is a view similar to Fig. 1 showing the neck forming tools in operative relation to a glass vial being necked; and Fig. 3 is an enlarged elevational view of the neck forming mechanism showing the relation of the same to the vial during the heating of the vial.

In its broader aspects the method consists in heating the portion of a body on which a neck is to be formed, in then forming threads on the outer surface of the heated portion of the body and in simultaneously smoothing the outer surface of the body and in reducing the diameter thereof on opposite sides of the threads formed thereon. The method will be more clearly understood when reference is had to the accompanying drawing wherein like reference characters designate corresponding parts throughout all views and wherein one form of apparatus for practicing the method is illustrated.

Referring them to the drawing, the body on which the neck is to be formed, such for example, as the glass vial 10, is illustrated as being supported in aligned notches 11 formed in rotatably mounted disks 12. The disks are illustrated as supported on a shaft 13 journalled in a suitable support 14. The body 10 is adapted to be rotated as for example by a rubber or like roller 15 which engages the body, this roller being suitably driven in any desired manner (not shown). While the glass body is being rotated, flames from suitable burners 16 are caused to play on the mouth end of the body to heat the same sufficiently to permit the neck forming operation to be performed.

By reference to Fig. 1 of the drawing, it will be noted that the neck to be formed comprises a threaded portion 20, a smooth cylindrical portion 21 between the threaded portion 20 and the mouth end of the body, and a smooth cylindrical portion 22 between the threaded portion 20 and the body portion of the body. For the purpose of forming the neck in this manner, suitable tools are engaged with the neck after the latter has been heated sufficiently to be properly shaped by these tools.

In the embodiment of the invention illustrated, there are disclosed forming tongs 25 these tongs having the resilient shanks 26 and 27 the shanks being united at their one end by the base portion 28.

Rotatably supported on the free end of the shank 26 is a threaded roller 30 adapted to engage the heated portion of the body to form the threads on the same. The size of the roller 30 and the pitch of the threads thereon are properly proportioned to the size of the vessel on which the threads are to be formed.

Rotatably carried by the free end of shank 27 is a roller 31. This roller is provided with the intermediate cutaway portion 32 and the end rims 33 and 34, these rims being of greater diameter than the intermediate portion of the roller as clearly illustrated. The portion 33 of roller 32 is adapted to engage the glass vessel at one side of the threaded portion 20 thereof to form the cylindrical extension 21, while the rim 34 is adapted to engage the vessel at the opposite side of the threaded portion thereof to form the smooth cylindrical portion 22 thereof.

During the neck forming operation, it is desirable to insert a plunger into the open end of the vessel and to likewise smooth the edge of the vessel which defines the mouth. For this purpose there is provided a plunger 35 adapted to enter the vessel, this plunger having a shouldered portion 36 adapted to engage the free edge of the vessel which defines the mouth thereof.

The plunger is fixed to one end of a shaft 37, the opposite end of this shaft being secured as at 38 to the base 28 of the tongs. The shaft 37 is mounted for longitudinal sliding movement in a sleeve 39 which is swivelly carried by the upper end of a rod 40 which is adjustably supported in a suitable standard 41.

In practicing the method, the body to be processed such for example, as the glass vial 10, is supported by the disks 12 and is rotated by the roller 15. With the tools 30 and 31 out of engagement with the vial the portion thereof on which the neck is to be formed, is heated by the burner or burners 16.

When the vial has been sufficiently heated, the tongs together with the plunger supporting rod 37 are moved forwardly until the plunger 35 enters the open end of the vial and the shoulder 36 abuts the free edge of the vial which defines the vial mouth. The tools 30 and 31 are then simultaneously brought into engagement with the heated outer surface of the vial, the roller 30 forming the threaded portion 20 on the vial and the roller or tool 31 forming the cylindrical smooth portions 21 and 22 on opposite sides of the threaded portion 20.

The rim 34 reduces the cross sectional diameter of the vial between the threaded portion thereof and the body portion thereof and acts to support the threads on the vial at the inner end thereof. The rim 33 forms a cylindrical elongation 21 on the vial and this cylindrical elongation cooperating with the smooth rim formed by the shoulder 36 provides that the mouth end of the vial will be smooth and even for accurate engagement with a closure cap.

It might be noted that the rim 33 might be of any diameter desired insofar as the elongation 21 which is produced thereby does not have a greater diameter than the root diameter of the thread. It further constitutes a feature of this invention that the cutaway portion 32 of the tool 31 is of such a diameter that it regulates the outside diameter of the threads causing the threads to be uniform in diameter and eliminating small elevations and rough portions on the threads.

For the purpose of illustration, the tools 30 and 31 have been illustrated as being rotatably carried by the usual glassmaker's tongs. It is to be understood however, that these tools might, if desired, be fixed to the free ends of the tongs or might be incorporated in an automatic neck forming machine of the character disclosed in Halversen Patent Number 1,437,239 issued November 28, 1922. It will be apparent that the illustrated tools might readily be substituted for the tools disclosed in the said patent whereby the tools would be automatically brought into operative relation with respect to the vial on which the neck is to be formed.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claim.

What I claim as my invention is:

In an apparatus of the class described, means for rotatably supporting a vial, means for rotating the vial, means for heating the outside of the vial adjacent the mouth end thereof, a rotatably mounted threaded roller adapted to engage the outside of the heated vial adjacent the mouth end thereof to form threads on the outer surface of the vial, a second rotatably mounted roller having spaced rim portions adapted to engage the vial on opposite sides of the threaded portion thereof to reduce the diameter of the vial and smooth the same on opposite sides of the threaded portion of the vial, said second roller having a portion of reduced diameter disposed between said rim portions and of a length substantially equal to the length of the threaded roller, the reduced portion of the second roller being of such a diameter as to have limited contact with the threads formed by the threaded roller while said spaced rim portions are reducing the diameter of the vial to smooth the threads on the vial and to regulate the diameter thereof.

JAKOB DICHTER.